(12) United States Patent
Kakehi (10) Patent No.: US 8,301,206 B2
(45) Date of Patent: Oct. 30, 2012

(54) IN-VEHICLE APPARATUS WITH HANDSFREE FUNCTION

(75) Inventor: Toru Kakehi, Toyoake (JP)

(73) Assignee: Denso Corporation, Kariya (JP)

( * ) Notice: Subject to any disclaimer, the term of this patent is extended or adjusted under 35 U.S.C. 154(b) by 316 days.

(21) Appl. No.: 12/658,480

(22) Filed: Feb. 9, 2010

(65) Prior Publication Data

US 2010/0210317 A1    Aug. 19, 2010

(30) Foreign Application Priority Data

Feb. 13, 2009   (JP) ................................. 2009-031231

(51) Int. Cl.
H04M 1/00    (2006.01)
H04B 7/00    (2006.01)

(52) U.S. Cl. .................. 455/569.2; 455/41.1; 455/41.2; 455/41.3; 455/556.1; 455/556.2; 455/551; 455/569.1

(58) Field of Classification Search ................. 455/41.1, 455/41.2, 41.3, 556.1, 556.2, 551, 569.1
See application file for complete search history.

(56) References Cited

U.S. PATENT DOCUMENTS

| | | | |
|---|---|---|---|
| 7,430,441 B2 * | 9/2008 | Nagahama et al. ......... | 455/569.1 |
| 7,773,989 B2 * | 8/2010 | Tobe et al. ................. | 455/435.2 |
| 2005/0070336 A1 * | 3/2005 | Tamura ........................ | 455/567 |
| 2005/0135297 A1 * | 6/2005 | Katayama .................... | 370/328 |
| 2005/0202852 A1 | 9/2005 | Wada | |
| 2006/0079182 A1 | 4/2006 | Matsuda | |
| 2007/0129116 A1 | 6/2007 | Katoh et al. | |
| 2007/0178838 A1 | 8/2007 | Matsuda | |
| 2007/0255435 A1 * | 11/2007 | Cohen et al. .................... | 700/94 |
| 2008/0280655 A1 | 11/2008 | Ozaki | |
| 2009/0124281 A1 * | 5/2009 | Takamune et al. ......... | 455/550.1 |

FOREIGN PATENT DOCUMENTS

| | | |
|---|---|---|
| JP | 2002-223288 | 8/2002 |
| JP | 2005-260822 | 9/2005 |
| JP | 2006-148864 | 6/2006 |
| JP | 2006-319622 | 11/2006 |
| JP | 2007-158670 | 6/2007 |
| JP | 2007-208697 | 8/2007 |
| JP | 2008-278172 | 11/2008 |

OTHER PUBLICATIONS

Office action dated Oct. 26, 2010 in corresponding Japanese Application No. 2009-031231.
Office Action dated Jun. 29, 2012 from Chinese Patent Office in corresponding Application No. 2010-10115761.3 with English translation.

* cited by examiner

*Primary Examiner* — Wen Huang
(74) *Attorney, Agent, or Firm* — Harness, Dickey & Pierce, PLC (57) ABSTRACT

An in-vehicle handsfree apparatus establishes concurrent connection between a BT interface device and a cellular phone with respect to a handsfree profile (HFP) for realizing a handsfree phone call, a message access profile (MAP) for realizing a mail transfer, and an audio video profile (AVP) for realizing an audio data transfer. During a duration of the concurrent connection being established, a disconnection request of HFP or MAP occurs. In such a case, MAP is disconnected in conjunction with having disconnected HFP, or HFP is disconnected in conjunction with having disconnected MAP.

8 Claims, 3 Drawing Sheets

IN-VEHICLE APPARATUS WITH HANDSFREE FUNCTION

CROSS REFERENCE TO RELATED APPLICATION

The present application is based on and incorporates herein by reference Japanese Patent Application No. 2009-31231 filed on Feb. 13, 2009.

FIELD OF THE INVENTION

The present invention relates to an in-vehicle apparatus with a handsfree function, the apparatus configured to establish, with a cellular phone, concurrent connection of several communications protocols including a first-type communications protocol. The first-type communications protocol belongs to a classification to have a function of notification from the cellular phone to the in-vehicle apparatus as to an arrival of an access from a communications network to the cellular phone.

BACKGROUND OF THE INVENTION

[Patent document 1] JP-2002-223288 A
[Patent document 2] JP-2008-278172 A

A main application of a cellular phone, which is brought into a vehicle or a vehicle compartment, is a handsfree phone call. There is a case that a cellular phone with Bluetooth (registered trademark, referred to as BT) communications function is brought into a compartment of a vehicle equipped with an in-vehicle apparatus which also has the Bluetooth communications function. In such cases, a handsfree profile (referred to as HFP) is connected for achieving a handsfree phone call, which is defined as an electronic communications standard of BT between in-vehicle apparatuses and cellular phones. For example, the foregoing configuration is disclosed in Patent document 1. An audio video profile (referred to as AVP) is connected for achieving an audio data transfer, which is defined as an electronic communications standard of BT between in-vehicle apparatuses and cellular phones. Further, the audio visual profile and the handsfree profile are connected at the same time (so-called concurrent connection or multi-connection). For example, the foregoing configuration is disclosed in Patent document 2.

Incidentally, a mail function is a representative application using cellular phones. A message access profile (referred to as MAP) is studied for realizing a mail transfer, which is defined as a communications standard of BT. The message access profile is to notify an in-vehicle apparatus of an incoming mail arriving a cellular phone brought into a compartment of a vehicle, thereby enabling notification of the mail arrival via the in-vehicle apparatus to a user.

The above-mentioned HFP is a profile having a function of notification of an arrival of an incoming voice call via an in-vehicle apparatus to a user, the incoming voice call arriving at a cellular phone from a telecommunications network. The above-mentioned MAP is a profile having a function of notification of an arrival of an incoming electronic mail via an in-vehicle apparatus to a user, the incoming electronic mail arriving from a telecommunications network to a cellular phone. While paying his attention to the above functions of the HFP and MAP, the applicant studies the following configuration. When connecting the MAP between an in-vehicle apparatus and a cellular phone, the HFP is also certainly connected, or, in other words, concurrent connection of both the HFP and MAP is established between the in-vehicle apparatus and the cellular phone. Such a configuration is considered for anticipating the following situation or disadvantage. In the state where, between the in-vehicle apparatus and the cellular phone, the HFP is not connected while the MAP is connected, an arrival of the mail to the cellular phone is notified to the user via the in-vehicle apparatus, whereas an arrival of an incoming voice call to the cellular phone is notified to the user via the cellular phone, instead of via the in-vehicle apparatus. The notifying apparatuses, relative to an arrival of an incoming voice call and an arrival of a mail, differ from each other, thereby producing a possibility that the notification of the arrival of the incoming voice call via the cellular phone may affect the user's driving operation.

In the above configuration in which the concurrent connection of the HFP and the MAP is established between the in-vehicle apparatus and the cellular phone, when disconnecting the HFP and MAP, it is expected that the respective profiles are disconnected independently of each other. In this regard, however, in such a configuration in which the HFP and MAP are respectively disconnected independently of each other, it is necessary for a user to perform a manipulation to disconnect each of the profiles, thereby posing a disadvantage in operability. In contrast, when performing a disconnection manipulation or operation of the HFP while not performing a disconnection operation of the MAP, the above explained state occurs in which, between the in-vehicle apparatus and the cellular phone, the MAP is being connected but the HFP is not connected, thereby posing a disadvantage in user's convenience. Furthermore, the in-vehicle apparatus needs to manage connection and disconnection for every profile, thereby posing a disadvantage to complicate the processing.

SUMMARY OF THE INVENTION

The present invention is made in view of the above situation. It is an object to provide an in-vehicle apparatus, which has a handsfree function and is capable of improving operability and convenience and simplifying processing for disconnecting several communications protocols in a state where the several communications protocols are under concurrent connection.

According to an example of the present invention, an in-vehicle apparatus with a handsfree function is provided as follows. Several communications protocols are connected simultaneously with a cellular phone to establish concurrent connection. The several communications protocols include first-type communications protocols. The first-type communications protocol belongs to a classification to have a function of notification from the cellular phone to the in-vehicle apparatus when an arrival of transmission, which comes from a communications network, occurs at the cellular phone. Connection and disconnection of a communications protocol is controlled between the connecting means and the cellular phone. An occurrence of a disconnection' request of a communications protocol, the connection of which is established, is determined. In case that it is determined that a disconnection request to disconnect one of a plurality of first-type communications protocols has occurred during a duration while concurrent connection with respect to the plurality of first-type communications protocols is established with the cellular phone, an other of the plurality of first-type communications protocols except the one of the plurality of first-type communications protocols is disconnected, in conjunction with having disconnected the one of the plurality of first-type communications protocols, the disconnection request of which has occurred.

According to another example of the present invention, a method is provided for disconnecting a communications protocol using an in-vehicle apparatus with a handsfree function with a cellular phone. The method comprises: (i) connecting several communications protocols simultaneously with the cellular phone to establish concurrent connection, the several communications protocols including a plurality of first-type communications protocols, the first-type communications protocol belonging to a classification to have a function of notification from the cellular phone to the in-vehicle apparatus when an arrival of transmission, which comes from a communications network, occurs at the cellular phone; (ii) executing a determination as to whether a disconnection request to disconnect one of the plurality of first-type communications protocols has occurred during a duration while concurrent connection with respect to the plurality of first-type communications protocols is established with the cellular phone; and (iii) disconnecting, when the determination is affirmatively executed, an other of the plurality of first-type communications protocols except the one of the plurality of first-type communications protocols, in conjunction with having disconnected the one of the plurality of first-type communications protocols, the disconnection request of which has occurred.

Thus, the first-type communications protocol has, with respect to an arrival of transmission from the communications network to the cellular phone, a function of notifying from the cellular phone to the in-vehicle apparatus. When one of the several first-type communications protocols is disconnected under the state where several first-type communications protocols are concurrently connected, another of the several first-type communications protocols is also disconnected in conjunction with having disconnected the one of the first-type communications protocols. Such a configuration can eliminate a need of a user to perform a manipulation to respectively disconnect the profiles, thereby enhancing the operability of the user. Moreover, the above configuration can help prevent the state where the apparatuses of notifying arrivals of transmissions are differentiated depending on the types of the transmissions. Furthermore, the above configuration can help prevent the state where the cellular phone undesirably notifies the user of the arrival of the transmission, which arrive at the cellular phone from the communications network. The usability can be thereby enhanced. Furthermore, the above configuration can eliminate the need of managing processes of connection and disconnection of the respective profiles, thereby simplifying the processes.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. First, a "Bluetooth" is a trade mark and referred to as "BT." An in-vehicle handsfree apparatus having a BT communications function (also referred to as BT-compliant) is mounted in a subject vehicle.

The following explains a case that a cellular phone also having the BT communications function is brought into a passenger compartment of the subject vehicle and becomes able to communicate with the in-vehicle BT-compliant handsfree apparatus.

Figure 1:
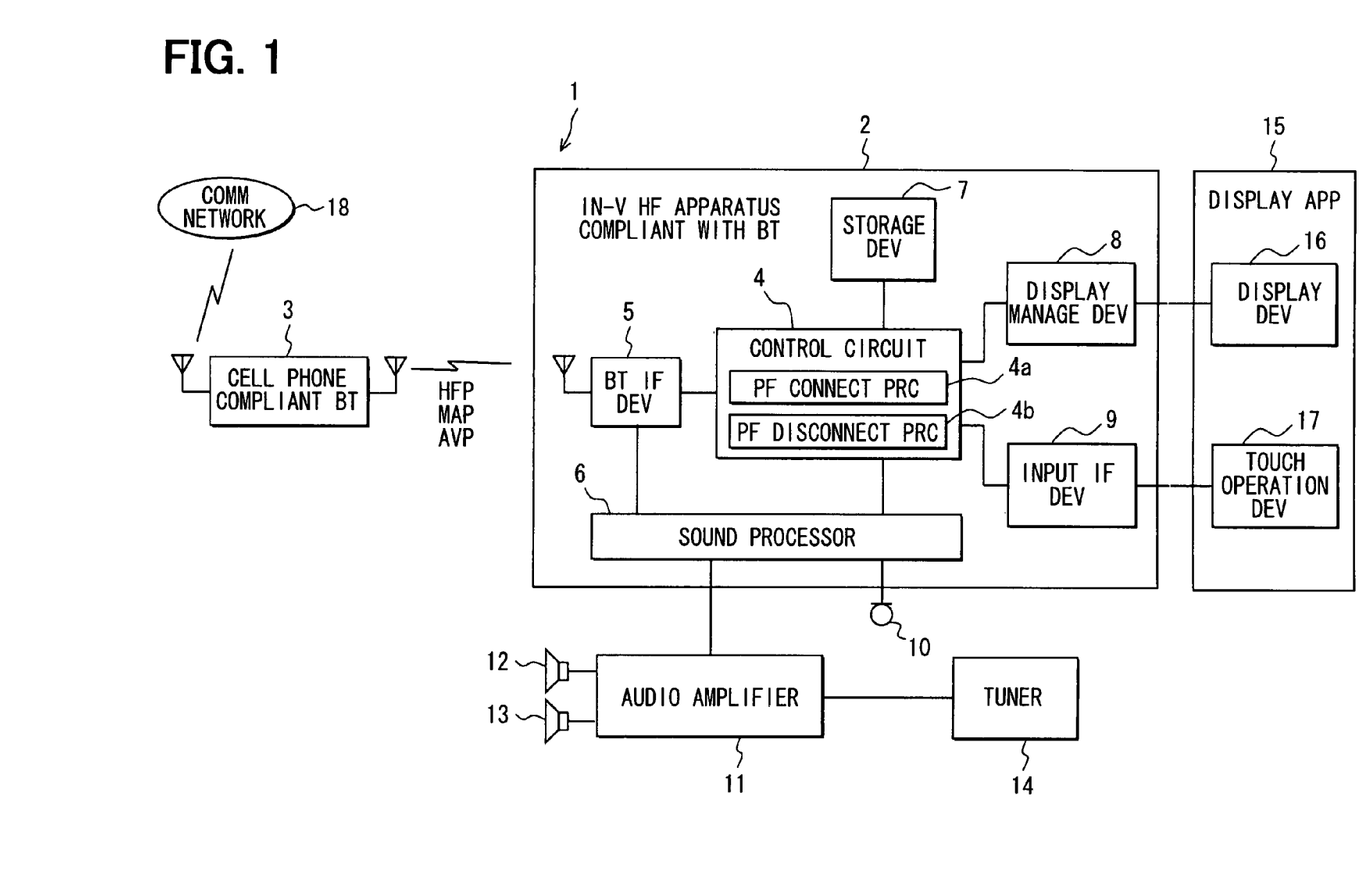
FIG. 1 is a functional block diagram according to an embodiment of the present invention.

The in-vehicle handsfree apparatus 2 and the cellular phone 3 are included in an in-vehicle handsfree system 1. The in-vehicle handsfree apparatus 2 is provided with a control circuit 4 (also referred to a control device or a controller, and further functioning as a disconnection request determination means or section), a BT interface (IF) device 5 (a connecting means or section), a call sound processor 6, a storage device 7 (also referred to as a storage means or section), a display management device 8, and a touch operation input interface device 9.

The control circuit 4 includes a known micro-computer having a CPU, RAM, ROM, I/O bus, etc., and controls an overall operation of the in-vehicle handsfree apparatus 2 such as a communications operation, and a data management operation. The BT interface device 5 has a function to execute a BT communications with the cellular phone 3. The BT interface device 5 is configured to be able to connect (or establish a connection of) all of the following three communications protocols at the same time (so-called multiple connection or concurrent connection). Further, it is noted that "connection" naturally means "communications Connection." Such three communications protocols, which are defined by a communications standard of BT include a HandsFree Profile (HFP) (also referred to as a handsfree phone call protocol) for realizing a handsfree phone call, a Message Access Profile (MAP) (also referred to as a mail transfer protocol) for realizing a mail transfer, and an Audio Video Profile (AVP) (also referred to as an audio data transfer protocol) for realizing an audio data transfer.

It is noted that each of HPF and MAP is classified as a first-type communications protocol, which is defined as having a function of arrival notification from the cellular phone 3 to the in-vehicle handsfree apparatus 2. The arrival notification signifies notifying the in-vehicle apparatus of an arrival of transmission such as an incoming voice call or an incoming mail arriving at or coming to the cellular phone 3 via the communication network 18, if each of HFP and MAP is connected between the cellular phone 3 and the BT interface device 5. In contrast, AVP is classified as a second-type communications protocol, which is defined as being other than the first-type communications protocol having the arrival notification function.

Further, it is noted that an electronic mail or a mail is defined in the present application as a general term for transmission such as a character (or text) message or image data exchanged in the known computer networks. Moreover, the BT interface device 5 is compliant with a Phone Book Access Profile (PBAP) for realizing a transfer of phone book data, outgoing call history data, or incoming call history data, or an Object Push Profile (OPP) for realizing the various data transfers, in addition to the HFP, MAP, and AVP. Herein, the above profiles signify communications protocols defined for every function.

The call sound processor 6 is connected with a microphone 10 and an audio amplifier 11. The microphone 10 is arranged at a position to easily collect user's utterance. The audio amplifier 11 is arranged outside of the in-vehicle handsfree apparatus 2 and connected with two speakers 12, 13. The speaker 12 and the speaker 13 are arranged symmetrically with respect to the full forth-and-back longitudinal direction of the vehicle mounted with the present in-vehicle handsfree apparatus 2. For example, the speaker 12 is arranged at the driver's seat door, while the speaker 13 is arranged at the front passenger door. In addition, the audio amplifier 11 is also connected to a tuner deck 14. For instance, the tuner deck 14 receives a musical tune sound from a storage medium for music, or a radio program from a radio station and outputs them to the audio amplifier 11. The audio amplifier 11 amplifies the received musical tune sound and the radio program and outputs the amplified sounds via the speakers 12, 13.

The storage device 7 stores the following various data, for example: phone book data indicating correspondence between telephone numbers and registration names; historical outgoing call data indicating correspondence between outgoing call clock times and destination phone numbers with respect to outgoing calls from the in-vehicle handsfree apparatus 2 or cellular phone 3 with which the HFP is connected; historical incoming call data indicating correspondence between incoming call clock times and source phone numbers with respect to incoming calls to the cellular phone 3 with which the in-vehicle handsfree apparatus 2 establishes the HFP connection.

A display apparatus 15 includes a display (screen) device 16 for displaying display windows, and a touch operation device (i.e., touch sensitive panel) 17 forming a touch switch on the display window. The display management device 8 manages or controls a display window operation of the display device 16 in the display apparatus 15 based on a display command notice (also referred to signal), which is received from the control circuit 4. The touch operation input interface device 9 receives an operation detection notice (also referred to as signal) via the touch operation device 17 according to the user having operated the touch switch presently formed on the display window. The input interface device 9 outputs the received operation detection notice to the control circuit 4. The control circuit 4 processes the received operation detection notice by analyzing it.

The cellular phone 3 includes the following: a control circuit to control an overall operation of the cellular phone 3; a telephone communications device to execute telephone communications with a telecommunications network 18; a BT interface (IF) device to execute BT communications; a key input device arranging the various keys which the user operates; a storage device to store the various data such as phone book data indicating correspondence between telephone numbers and registration names; and a display device to display the various display windows; a microphone to input a sound which the user utters; and a speaker which outputs as a reception sound a sound received from a call partner. It is noted that the BT interface device of the cellular phone 3 has a function to execute BT communications with the in-vehicle handsfree apparatus 2. The BT interface device is compliant with HFP, MAP, and AVP like the BT interface device 5 of the in-vehicle handsfree apparatus 2, and is configured to be able to establish a concurrent connection of the HFP, MAP, and AVP with the in-vehicle handsfree apparatus 2.

When the in-vehicle handsfree apparatus 2 and the cellular phone 3 are connecting the HFP with each other, an incoming voice call from the communications network 18 to the cellular phone 3 occurs (i.e., a voice call arrives at or comes to the cellular phone 3 via the communications network 18). In such cases, an incoming ring tone (or ring alert) of the incoming voice call is outputted via the speakers 12 and 13; further, an incoming window of the incoming voice call is displayed in the display device 16. The arrival of the incoming voice call is thus notified the user via the in-vehicle handsfree apparatus 2. When the in-vehicle handsfree apparatus 2 and the cellular phone 3 are connecting the MAP with each other, an arrival of an incoming mail via the communications network 18 to the cellular phone 3 occurs (i.e., a mail arrives at or comes to the cellular phone 3 via the communications network 18). In such cases, a ring tone of the mail arrival is outputted via the speakers 12, 13, and a mail arrival window is displayed in the display section 16. The mail arrival is thus notified the user via the in-vehicle handsfree apparatus 2.

Figure 2:
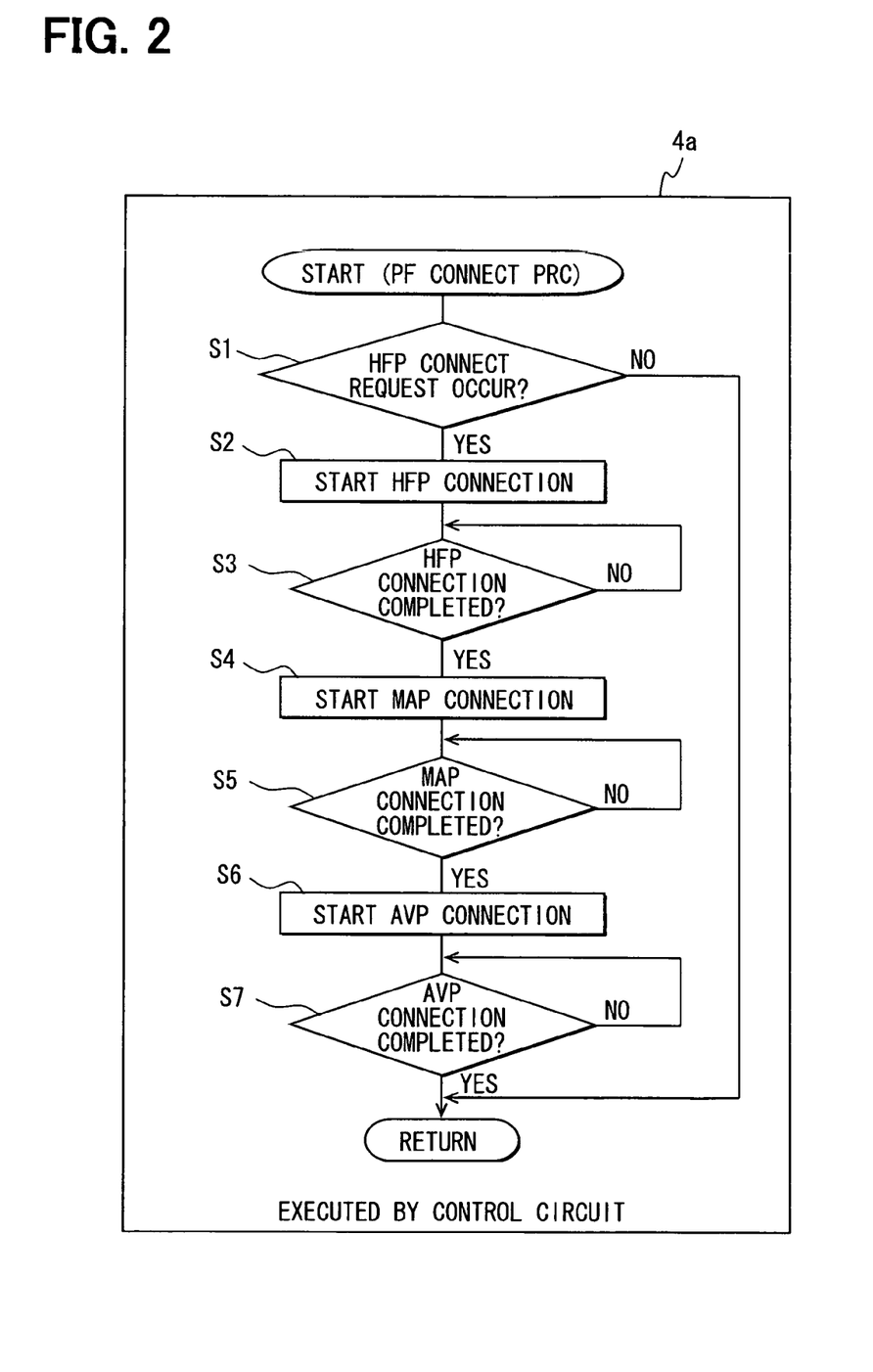
FIG. 2 is a flowchart (part 1)
Figure 3:
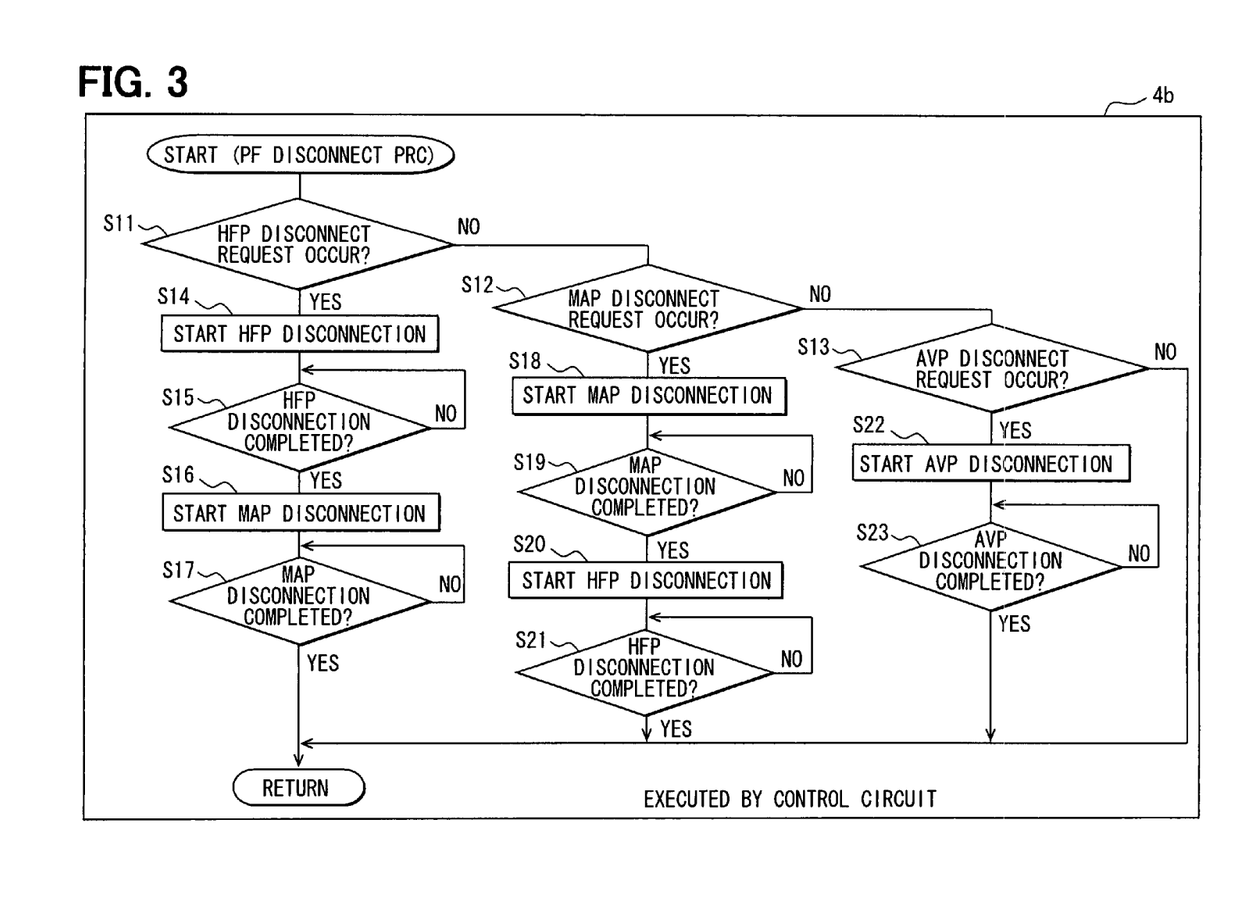
FIG. 3 is a flowchart (part 2).

An operation under the above configuration is explained with reference to FIGS. 2 and 3. FIG. 2 illustrates a profile connection process 4a executed by the control circuit 4 of the in-vehicle handsfree apparatus 2. In the profile connection process 4a, the in-vehicle handsfree apparatus 2 connects a profile with the cellular phone 3. FIG. 3 illustrates a profile disconnection process 4b executed by the control circuit 4 of the in-vehicle handsfree apparatus 2. In the profile disconnection process 4b, the in-vehicle handsfree apparatus 2 disconnects a profile, which is being connected with the cellular phone 3. Hereinafter, the profile connection process 4a and the profile disconnection process 4b are explained in this order. The following explains the case where the in-vehicle handsfree apparatus 2 and the cellular phone 3 establish or perform concurrent connection of HFP, MAP, and AVP between the in-vehicle handsfree apparatus 2 and the cellular phone 3. It is further noted that a flowchart or the processing of the flowchart in the present application includes sections (also referred to as steps), which are represented, for instance, as S110. Further, each section can be divided into several sub-sections while several sections can be combined into a single section. Furthermore, each of thus configured sections can be referred to as a means or unit and achieved not only as a software device but also as a hardware device.

(1) Profile Connection Process

In the in-vehicle handsfree apparatus 2, the control circuit 4 starts the profile connection process 4a. At S1, it is determined whether a connection request of HFP (registry request of HFP) occurred. When the control circuit 4 determines that the connection request of HFP does not occur (corresponding to "NO" at S1), The profile connection process 4a is completed; then, the processing returns to another process such as a main process.

It is noted that the control circuit 4 determines, for example, that the connection request of HFP is received via the touch operation device 17 when a user presses a predetermined touch key in the HFP connection request window (unshown) in the display device 16. When it is determined that the HFP connection request occurred ("YES" at S1), an HFP connection process is started at S2, the HFP connection process connecting HFP between the BT interface device 5 and the cellular phone 3.

In detail, when the control circuit 4 determines that the HFP connection request occurred, it is notified to the cellular phone 3 that the HFP connection request occurred. When it is determined that the BT interface device 5 received "PIN request" transmitted from the cellular phone 3, the BT interface device 5 is caused to transmit "PIN response request" to the cellular phone 3, and waits for the user's input of the PIN by operating the cellular phone 3. The user then operates the cellular phone 3 to input PIN; thereby, the cellular phone 3 transmits, to the BT interface device 5, "PIN response", "link key", and "authentication result" in order one by one. When the control circuit 4 determines that the BT interface device 5 receives those data elements, the control circuit 4 starts a process to register HFP with respect to the cellular phone 3 such that the HFP is associated with identification information (for example, telephone number) for identifying the cellular phone 3.

The control circuit 4 stands by the completion of the HFP connection process at S3. When the connection process of HFP is completed and it is determined that the process which registers HFP with respect to the cellular phone 3 is completed ("YES" at S3), the notice window of the HFP connection completion is displayed in the display device 16. It is notified to the user that the connection process of HFP was completed. Thus, connection with respect to HFP is established between the cellular phone 3 and the in-vehicle handsfree apparatus 2.

Subsequently, the control circuit 4 causes the BT interface device 5 to transmit to the cellular phone 3 "function confirmation request" which asks a profile with which the cellular phone 3 is compliant. The control circuit 4 receives via the BT interface device 5 "function response" transmitted from the cellular phone 3. When the control circuit 4 determines that the cellular phone 3 is compliant with MAP and AVP in addition to HFP, a MAP connection request window (not shown) is displayed which asks the connection request (registry request of MAP) of MAP is displayed on the display device 16. It is noted that the control circuit 4 determines, for example, that the connection request of MAP is received via the touch operation device 17 when a user presses a predetermined touch key in the MAP connection request window (unshown) in the display device 16. A MAP connection process is started at S4, the MAP connection process connecting MAP between the BT interface device 5 and the cellular phone 3.

For instance, when the control circuit 4 determines that the connection request of MAP was received via the touch operation device 17 based on the user's operation of pressing a predetermined key, the control device 4 transmits the "PIN response request" to the cellular phone 3 via the BT interface device 5, and waits the user's input of the PIN via the cellular phone 3. When the control circuit 4 determines that the BT interface device 5 received from the cellular phone 3 "PIN response," which is issued based on the user's input of the PIN via the cellular phone 3, the connection process of MAP is started to register MAP with respect to the cellular phone 3.

The control circuit 4 stands by the completion of the MAP connection process at S5. When the process is completed which registers MAP with respect to the cellular phone 3, and it is determined that the MAP connection process is completed ("YES" at S5), the notice window of the MAP connection completion is displayed in the display device 16. It is notified to the user that the connection process of MAP was completed. Thus, the connection with respect to MAP is established between the cellular phone 3 and the in-vehicle handsfree apparatus 2 while the concurrent connection with respect to HFP and MAP is established between the cellular phone 3 and the in-vehicle handsfree apparatus 2.

Subsequently, the control circuit 4 displays in the display device 16 an AVP connection request window (not shown) which asks the connection request of AVP (registry request of AVP). It is noted that the control circuit 4 determines, for example, that the connection request of AVP is received via the touch operation device 17 when a user presses a predetermined touch key in the AVP connection request window in the display device 16. The AVP connection process is started at S6, the AVP connection process connecting AVP between the BT interface device 5 and the cellular phone 3.

For instance, when the control circuit 4 determines that the connection request of AVP was received via the touch operation device 17 based on the user's operation of pressing a predetermined key, the control circuit 4 transmits the "PIN response request" to the cellular phone 3 via the BT interface device 5, and waits the user's input of the PIN via the cellular phone 3. When the control circuit 4 determines that the BT interface device 5 received from the cellular phone 3 "PIN response," which is issued based on the user's input of the PIN via the cellular phone 3, the connection process of AVP is started to register AVP with respect to the cellular phone 3.

The control circuit 4 stands by the completion of the connection process of AVP at S7. When the process which registers AVP with respect to the cellular phone 3 is completed and it is determined that the connection process of AVP is completed ("YES" at S7), the notice window of the AVP connection completion is displayed in the display device 16. It is notified to the user that the connection process of AVP was completed. Thus, the connection with respect to AVP is established between the cellular phone 3 and the in-vehicle handsfree apparatus 2 while the concurrent connection with respect to HFP, MAP, and AVP is established between the cellular phone 3 and the in-vehicle handsfree apparatus 2.

According to the series of process explained above, the control circuit 4 connects the profiles in the order of HFP, MAP, and AVP between the BT interface device 5 and the cellular phone 3. It is noted that the control circuit 4 sets up a condition for canceling the standby of the connection process of the respective profiles (for example, the standby time reaches a predetermined set time point). When the condition is satisfied during the period of standing by the connection process of each profile, the standby of the connection process of each profile is canceled (stopped). The processing advances to another process.

(2) Profile Disconnection Process

In the in-vehicle handsfree apparatus 2, the control circuit 4 starts a profile disconnection process 4b. It is determined whether a disconnection request occurred with respect to any one of profiles being connected between the BT interface device 5 and the cellular phone 3 occurred (S11 to S13). In other words, It is determined whether a disconnection request occurred with respect to any one of profiles of HFP, MAP, and AVP, under the concurrent connection being established with respect to HFP, MAP, and AVP between the cellular phone 3 and the in-vehicle handsfree apparatus 2. When it is determined that the disconnection request of any one of profiles does not occur ("NO" at S11, "NO" at S12, "NO" at S13), the profile disconnection process is completed. The processing then returns to another process (for example, main process).

It is noted that the control circuit 4 determines, for example, that the disconnection request of HFP is received via the touch operation device 17 when a user presses a predetermined touch key in the profile disconnection request window (unshown) in the display device 16. When it is determined that the HFP disconnection request occurred ("YES" at S11), an HFP disconnection process is started at S14 for disconnecting HFP between the BT interface device 5 and the cellular phone 3. The control circuit 4 stands by the completion of the disconnection process of HFP at S15. Subsequently, the control circuit 4 cancels the registration of HFP with respect to the cellular phone 3. When it is determined that the HFP connection process is completed ("YES" at S15), a MAP disconnection process for disconnecting MAP currently connected between the BT interface device 5 and the cellular phone 3 is started at S16 in conjunction with the disconnection of HFP. The control circuit 4 stands by the completion of the disconnection process of MAP at S17.

The control circuit 4 cancels registration of MAP with respect to the cellular phone 3. When it is determined that the MAP disconnection process is completed ("YES" at S17), the connection of AVP, which is being connected, is maintained without being disconnected between the BT interface device 5 and cellular phone 3 if the AVP is connected between the BT interface device 5 and the cellular phone 3 at the time. The profile disconnection process is thus completed. The processing then returns to another process.

It is noted that the control circuit 4 determines, for example, that the disconnection request of MAP is received via the touch operation device 17 when a user presses a predetermined touch key in the profile disconnection request window (unshown) in the display device 16. When it is determined that the MAP disconnection request occurred ("YES" at S12), a MAP disconnection process, which disconnects MAP being connected between the BT interface device 5 and the cellular phone 3, is started at S18. The control circuit 4 stands by the completion of the disconnection process of MAP at S19. Subsequently, the control circuit 4 cancels registration of MAP with respect to the cellular phone 3, and determines that the MAP disconnection process is completed ("YES" at S19). In conjunction with having disconnected MAP, the disconnection process of HFP, which disconnects HFP between the BT interface device 5 and the cellular phone 3, is started at S20. The control circuit 4 stands by the completion of the disconnection process of HFP at S21.

The control circuit 4 cancels registration of HFP with respect to the cellular phone 3. When it is determined that the HFP disconnection process is completed ("YES" at S21), the connection of AVP, which is being connected, is maintained without being disconnected between the BT interface device 5 and cellular phone 3 if the AVP is connected between the BT interface device 5 and the cellular phone 3 at the time, similarly. The profile disconnection process is thus completed. The processing then returns to another process.

It is noted that the control circuit 4 determines, for example, that the disconnection request of AVP is received via the touch operation device 17 when a user presses a predetermined touch key in the profile disconnection request window (unshown) in the display device 16. When it is determined that the AVP disconnection request occurred ("YES" at S13), an AVP disconnection process, which disconnects AVP being connected between the BT interface device 5 and the cellular phone 3, is started at S22. The control circuit 4 stands by the completion of the disconnection process of AVP at S23.

When the control circuit 4 cancels the registration of AVP with respect to the cellular phone 3 and determines that the disconnection process of AVP is completed ("YES" at S23), the connection of HFP and MAP, which are being connected, is maintained without being disconnected between the BT interface device 5 and cellular phone 3 if HFP and MAP are connected between the BT interface device 5 and the cellular phone 3 at the time. The profile disconnection process is thus completed. The processing then returns to another process.

According to the series of process explained above, when HFP, MAP, and AVP are connected between the BT interface device 5 and the cellular phone 3, the control circuit 4 disconnects MAP in conjunction with having disconnected HFP and disconnects HFP in conjunction with having disconnected MAP. It is noted that the control circuit 4 sets up a condition for canceling the standby of the disconnection process of the respective profiles (for example, the standby time reaches a predetermined set time point). When the condition is satisfied during the period of standing by the disconnection process of each profile, the standby of the disconnection process of each profile is canceled (stopped). The processing advances to another process.

According to the in-vehicle handsfree apparatus 2 of the present embodiment, the following takes place. Suppose the state where HFP, MAP, and AVP are currently being connected between the BT interface device 5 and the cellular phone 3. In other words, the concurrent connection with respect to HFP, MAP, and AVP is being established between the BT interface device 5 and the cellular phone 3. When the disconnection request of HFP occurs, MAP is also disconnected in conjunction with having disconnected HFP. Moreover, when the disconnection request of MAP occurs, HFP is also disconnected in conjunction with having disconnected MAP. Such a configuration of the in-vehicle handsfree apparatus 2 can eliminate need of a user's operation, which disconnects HFP and MAP for every profile, thereby enhancing the usability. Moreover, the above configuration can help prevent as much as possible the state where the apparatus of notifying an arrival of an incoming voice call and the apparatus of notifying an arrival of an incoming mail are different from each other. Furthermore, the above configuration can help prevent as much as possible the state where the cellular phone 3 notifies the user of the arrival of the incoming voice call and the arrival of the incoming mail. The usability can be thereby enhanced. Furthermore, the above configuration can eliminate the need of managing processes of connection and disconnection of the respective profiles, thereby simplifying the processes.

While MAP is disconnected in conjunction with having disconnected HFP and HFP is disconnected in conjunction with having disconnected MAP, the connection of AVP is maintained without being disconnected. Such a configuration can continue the application regardless of HFP or MAP, i.e., regardless of connection and disconnection of HFP or MAP.

The present invention is not limited only to the above-mentioned embodiment, and can be modified or extended as follows. The function of the in-vehicle handsfree apparatus 2 may be included in another in-vehicle apparatus, such as an in-vehicle navigation apparatus. It is noted that each of HFP and MAP may be defined as a first-type communications protocol, whereas AVP may be defined as a second-type communications protocol, which has a function different from that of the first-type communications protocol. Furthermore, not only AVP but also PBAP and OPP can be defined as a second-type communications protocol. While MAP is disconnected in conjunction with having disconnected HFP and HFP in conjunction with MAP, the connection of PBAP or OPP can be maintained without being disconnected. In the above embodiment, HFP is connected between the BT interface device and the cellular phone; "function confirmation request" is then transmitted to the cellular phone; "function response" is transmitted from the cellular phone and the in-vehicle handsfree apparatus receives "function response"; and whether the cellular phone is compliant with MAP and AVP as well as HFP is determined. Without need to be limited to such a configuration, the following configuration can be embodied. That is, without causing the cellular phone to transmit "function confirmation request," the cellular phone voluntarily transmits "function response" and the in-vehicle handsfree apparatus receives "function response"; and it is determined whether the cellular phone is compliant with MAP and AVP as well as HFP.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, an in-vehicle apparatus with a handsfree function is provided as follows. Means is configured for connecting several communications protocols simultaneously with a cellular phone to establish concurrent connection. The several communications protocols include first-type communications protocols. The first-type communications protocol belongs to a classification to have a function of notification from the cellular phone to the in-vehicle apparatus when an arrival of transmission, which comes from a communications network, occurs at the cellular phone. Means is configured for controlling connection and disconnection of a communications protocol between the connecting means and the cellular phone. Means is configured for determining an occurrence of a disconnection request of a communications protocol, which is connected with the cellular phone by the connecting means. Herein, in case that the determining means determines that a disconnection request to disconnect one of a plurality of first-type communications protocols has occurred during a duration while concurrent connection with respect to the plurality of first-type communications protocols is established with the cellular phone by the connecting means, the controlling means is further configured to disconnect an other of the plurality of first-type communications protocols except the one of the plurality of first-type communications protocols, in conjunction with having disconnected the one of the plurality of first-type communications protocols, the disconnection request of which has occurred.

As an optional aspect of the in-vehicle apparatus, the connecting means may be further configured to establish concurrent connection with the cellular phone with respect to two first-type communications protocols of a handsfree phone call protocol and a mail transfer protocol. The handsfree phone call protocol has a function to report, to the in-vehicle handsfree apparatus, an arrival of an incoming voice call from the communications network to the cellular phone, while the mail transfer protocol has a function to report, to the in-vehicle handsfree apparatus, an arrival of an incoming mail from the communications network to the cellular phone. In case that the determining means determines that a disconnection request to disconnect one of the handsfree phone call protocol and the mail transfer protocol occurred during a duration while concurrent connection with respect to the handsfree phone call protocol and the mail transfer protocol is established with the cellular phone by the connecting means, the controlling means may be further configured to disconnect an other of the handsfree phone call protocol and the mail transfer protocol in conjunction with having disconnected the one, the disconnection request of which has occurred.

Thus, when one of the handsfree phone call protocol and mail transfer protocol is disconnected under the state where the concurrent connection of the handsfree phone call protocol and mail transfer protocol has been established, the other is also disconnected in conjunction with having disconnected the one of the handsfree phone call and mail transfer protocol. The operability and convenience can be thus improved, thereby simplifying the processes.

As an optional aspect of the handsfree apparatus, the connecting means may be further configured to establish concurrent connection with the cellular phone with respect to several communications protocols including a second-type communications protocol belonging to an other classification to have a function different from the function of the first-type communications protocol. In case that the determining means determines that a disconnection request of one of the plurality of first communications protocols occurred during a duration while concurrent connection with the cellular phone is established by the connecting means with respect to (i) the plurality of first communications protocols and (ii) a second-type communications protocol, the controlling means may be further configured to disconnect an other of the plurality of first-type communications protocols except the one of the plurality of first-type communications protocols, in conjunction with having disconnected the one of the plurality of first-type communications protocols, the disconnection request of which has occurred, while maintaining connection with the cellular phone with respect to the second-type communications protocol without disconnecting.

Thus, when the one of the first-type communications protocols is disconnected under the state where several first-type communications protocols have been concurrently connected, the operability and convenience can be improved, thereby simplifying the processes. Further, the connection of the second-type communications protocol is maintained without being disconnected. The application by the second-type communications protocol can be continued regardless of connection and disconnection of the first-type communications protocol.

As an optional aspect of the handsfree apparatus, the connecting means may be further configured to establish concurrent connection with the cellular phone with respect to an audio data transfer protocol in addition to the handsfree phone call protocol and the mail transfer protocol. The audio data transfer protocol has a function to transmit audio data stored in the cellular phone to the in-vehicle apparatus and belongs to the second-type communications protocol. In case that the determining means determines that a disconnection request to disconnect one of the handsfree phone call protocol and the mail transfer protocol occurred during a duration while the concurrent connection with the cellular phone is established by the connecting means with respect to the handsfree phone call protocol, the mail transfer protocol, and the audio data transfer protocol, the controlling means may be further configured to disconnect an other of the handsfree phone call protocol and the mail transfer protocol in conjunction with having disconnected the one, the disconnection request of which has occurred, while maintaining connection with the cellular phone with respect to the audio data transfer protocol without disconnecting.

Thus, when one of the handsfree phone call protocol and mail transfer protocol is disconnected under the state where the concurrent connection of the handsfree phone call protocol and mail transfer protocol has been established, the other is also disconnected in conjunction with having disconnected the one of the handsfree phone call and mail transfer protocol. The operability and convenience can be thus improved, thereby simplifying the processes. Further in the above configuration, the connection of the audio data transfer protocol is maintained without being disconnected. Without need to be associated with the connection or disconnection of the handsfree phone call protocol or the mail transfer protocol, the application by the audio data transfer protocol can be continued.

It will be obvious to those skilled in the art that various changes may be made in the above-described embodiments of the present invention. However, the scope of the present invention should be determined by the following claims.

What is claimed:

1. An in-vehicle apparatus with a handsfree function for a vehicle, the apparatus comprising:

means for connecting several communications protocols simultaneously with a cellular phone to establish concurrent connection, the several communications protocols including first-type communications protocols,
   each of the plurality of first-type communications protocols belonging to a classification to have an arrival notification function that is a function of notification from the cellular phone to the in-vehicle apparatus when an arrival of transmission, which comes from a communications network, occurs at the cellular phone,
   the plurality of first-type communications protocols corresponding to different types of transmissions and having different types of arrival notification functions for the different types of transmissions, respectively;
means for controlling connection and disconnection of a communications protocol between the connecting means and the cellular phone; and
means for determining an occurrence of a disconnection request of a communications protocol, which is connected with the cellular phone by the connecting means, wherein,
in case that the determining means determines that a disconnection request to disconnect one of a plurality of first-type communications protocols has occurred during a duration while concurrent connection with respect to the plurality of first-type communications protocols is established with the cellular phone by the connecting means,
the controlling means is further configured to disconnect an other of the plurality of first-type communications protocols except the one of the plurality of first-type communications protocols, in conjunction with having disconnected the one of the plurality of first-type communications protocols, the disconnection request of which has occurred.

2. The in-vehicle apparatus according to claim 1, wherein:
the connecting means is further configured to establish concurrent connection with the cellular phone with respect to two first-type communications protocols of a handsfree phone call protocol and a mail transfer protocol,
   the handsfree phone call protocol having as the arrival notification function a function to report, to the in-vehicle handsfree apparatus, an arrival of an incoming voice call that is one of the different types of transmissions from the communications network to the cellular phone,
   the mail transfer protocol having as the arrival notification function a function to report, to the in-vehicle handsfree apparatus, an arrival of an incoming mail that is one of the different types of transmissions from the communications network to the cellular phone; and
in case that the determining means determines that a disconnection request to disconnect one of the handsfree phone call protocol and the mail transfer protocol occurred during a duration while concurrent connection with respect to the handsfree phone call protocol and the mail transfer protocol is established with the cellular phone by the connecting means,
the controlling means is further configured to disconnect an other of the handsfree phone call protocol and the mail transfer protocol in conjunction with having disconnected the one, the disconnection request of which has occurred.

3. The in-vehicle apparatus according to claim 1, wherein:
the connecting means is further configured to establish concurrent connection with the cellular phone with respect to several communications protocols including a second-type communications protocol belonging to an other classification to have a function other than the arrival notification function of the first-type communications protocol; and
in case that the determining means determines that a disconnection request of one of the plurality of first communications protocols occurred during a duration while concurrent connection with the cellular phone is established by the connecting means with respect to (i) the plurality of first communications protocols and (ii) a second-type communications protocol,
the controlling means is further configured to disconnect an other of the plurality of first-type communications protocols except the one of the plurality of first-type communications protocols, in conjunction with having disconnected the one of the plurality of first-type communications protocols, the disconnection request of which has occurred,
wherein when the other of the plurality of first-type communications protocols as well as the one of the plurality of first-type communications protocols are disconnected, connection with the cellular phone with respect to the second-type communications protocol is maintained without being simultaneously disconnected.

4. The in-vehicle apparatus according to claim 3, wherein:
the connecting means is further configured to establish concurrent connection with the cellular phone with respect to an audio data transfer protocol in addition to the handsfree phone call protocol and the mail transfer protocol,
   the audio data transfer protocol having a function to transmit audio data stored in the cellular phone to the in-vehicle apparatus,
the audio data transfer protocol belonging to the second-type communications protocol; and
in case that the determining means determines that a disconnection request to disconnect one of the handsfree phone call protocol and the mail transfer protocol occurred during a duration while the concurrent connection with the cellular phone is established by the connecting means with respect to the handsfree phone call protocol, the mail transfer protocol, and the audio data transfer protocol,
the controlling means is further configured to disconnect an other of the handsfree phone call protocol and the mail transfer protocol in conjunction with having disconnected the one, the disconnection request of which has occurred,
wherein when the other of the handsfree phone call protocol and the mail transfer protocol is disconnected along with the one of the handsfree phone call protocol and the mail transfer protocol connection with the cellular phone with respect to the audio data transfer protocol is maintained without being simultaneously disconnected.

5. The in-vehicle apparatus according to claim 1, wherein:
the connecting means is further configured to establish concurrent connection with the cellular phone with respect to several communications protocols including a second-type communications protocol belonging to an other classification to have a different function without having the arrival notification function of the first-type communications protocol; and
in case that the determining means determines that a disconnection request of one of the plurality of first communications protocols occurred during a duration while concurrent connection with the cellular phone is established by the connecting means with respect to (i) the plurality of first communications protocols and (ii) a second-type communications protocol, the controlling means is further configured to disconnect an other of the plurality of first-type communications protocols except the one of the plurality of first-type communications protocols, in conjunction with having disconnected the one of the plurality of first-type communications protocols, the disconnection request of which has occurred, wherein when the other of the plurality of first-type communications protocols as well as the one of the plurality of first-type communications protocols are disconnected, connection with the cellular phone with respect to the second-type communications protocol is maintained without being simultaneously disconnected.

6. The in-vehicle apparatus according to claim 5, wherein:

the connecting means is further configured to establish concurrent connection with the cellular phone with respect to two first-type communications protocols of a handsfree phone call protocol and a mail transfer protocol, the handsfree phone call protocol having as the arrival notification function a function to report, to the in-vehicle handsfree apparatus, an arrival of an incoming voice call that is one of the different types of transmissions from the communications network to the cellular phone, the mail transfer protocol having as the arrival notification function a function to report, to the in-vehicle handsfree apparatus, an arrival of an incoming mail that is one of the different types of transmissions from the communications network to the cellular phone; and in case that the determining means determines that a disconnection request to disconnect one of the handsfree phone call protocol and the mail transfer protocol occurred during a duration while concurrent connection with respect to the handsfree phone call protocol and the mail transfer protocol is established with the cellular phone by the connecting means, the controlling means is further configured to disconnect an other of the handsfree phone call protocol and the mail transfer protocol in conjunction with having disconnected the one, the disconnection request of which has occurred.

7. The in-vehicle apparatus according to claim 6, wherein:

the connecting means is further configured to establish concurrent connection with the cellular phone with respect to an audio data transfer protocol in addition to the handsfree phone call protocol and the mail transfer protocol, the audio data transfer protocol belonging to the second-type communications protocol, the audio data transfer protocol having as the different function a function to transmit audio data stored in the cellular phone to the in-vehicle apparatus; and in case that the determining means determines that a disconnection request to disconnect one of the handsfree phone call protocol and the mail transfer protocol occurred during a duration while the concurrent connection with the cellular phone is established by the connecting means with respect to the handsfree phone call protocol, the mail transfer protocol, and the audio data transfer protocol, the controlling means is further configured to disconnect an other of the handsfree phone call protocol and the mail transfer protocol in conjunction with having disconnected the one, the disconnection request of which has occurred, wherein when the other of the handsfree phone call protocol and the mail transfer protocol is disconnected along with the one of the handsfree phone call protocol and the mail transfer protocol, connection with the cellular phone with respect to the audio data transfer protocol is maintained without being simultaneously disconnected.

8. A method for disconnecting a communications protocol using an in-vehicle apparatus with a handsfree function with a cellular phone, the method comprising:

connecting several communications protocols simultaneously with the cellular phone to establish concurrent connection, the several communications protocols including a plurality of first-type communications protocols, each of the plurality of first-type communications protocols belonging to a classification to have an arrival notification function that is a function of notification from the cellular phone to the in-vehicle apparatus when an arrival of transmission, which comes from a communications network, occurs at the cellular phone;

the plurality of first-type communications protocols corresponding to different types of transmissions and having different types of arrival notification functions for the different types of transmissions, respectively;

executing a determination as to whether a disconnection request to disconnect one of the plurality of first-type communications protocols has occurred during a duration while concurrent connection with respect to the plurality of first-type communications protocols is established with the cellular phone; and disconnecting, when the determination is affirmatively executed, an other of the plurality of first-type communications protocols except the one of the plurality of first-type communications protocols, in conjunction with having disconnected the one of the plurality of first-type communications protocols, the disconnection request of which has occurred.

* * * * *